Figure 1:
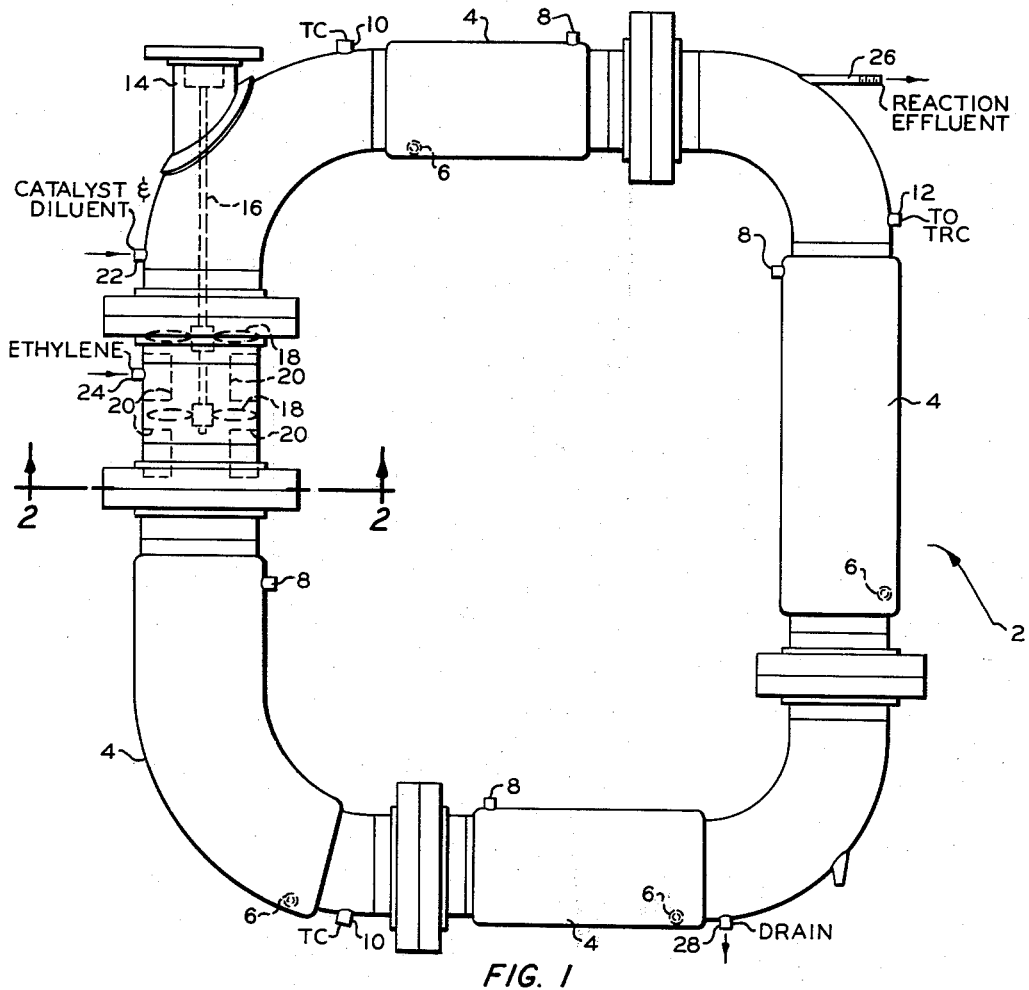

April 26, 1966     D. D. NORWOOD     3,248,179
METHOD AND APPARATUS FOR THE PRODUCTION OF SOLID
POLYMERS OF OLEFINS
Filed Feb. 26, 1962

INVENTOR.
D. D. NORWOOD

BY *Hudson and Young*

ATTORNEYS

United States Patent Office 3,248,179
Patented Apr. 26, 1966

3,248,179
METHOD AND APPARATUS FOR THE PRODUCTION OF SOLID POLYMERS OF OLEFINS
Donald D. Norwood, Bartlesville, Okla., assignor to Phillips Petroleum Company, a corporation of Delaware
Filed Feb. 26, 1962, Ser. No. 179,268
3 Claims. (Cl. 23—285)

This invention relates to the polymerization of olefins. In one aspect, the invention relates to improved method and apparatus for producing high molecular weight solid olefin polymers.

This application is a continuation-in-part application of the copending application of Donald D. Norwood, Serial No. 819,391, filed June 10, 1959, now abandoned.

It is disclosed in Hogan et al., U.S. Patent 2,825,721, that unique polymers and copolymers can be produced by contacting one or more olefins with a catalyst comprising as an essential ingredient chromium oxide, preferably including a substantial amount of hexavalent chromium. The chomium oxide is associated with at least one other oxide particularly selected from the group consisting of silica, alumina, zirconia and thoria. The olefin feed used for the polymerization is at least one olefin selected from 1-olefins having a maximum of 8 carbon atoms per molecule and no branching nearer the double bond than the 4-position. Examples of olefins which can be polymerized by the described method include ethylene, propylene, 1-butene, 1-pentane and 1,3-butadiene. Copolymers, such as ethylene-propylene copolymers and ethylene-butadiene copolymers, can also be prepared by utilizing the chromium oxide containing catalyst. The temperature for the polymerization reaction is usually in the range of about 100 to about 500° F. with a temperature in the range of 275 to 375° F. being often preferred for the polymerization of ethylene. The olefins are polymerized in the presence of a hydrocarbon diluent, for example, an acyclic, alicyclic or aromatic compound which is inert.

Recently it has been discovered that there is a critical polymerization temperature range within the broad range disclosed by Hogan et al. in which it is possible to produce increased yields of high molecular weight polymers of olefins which are insoluble in the hydrocarbon diluent. This polymer is formed in association with the polymerization catalyst and is suspended in the liquid diluent in solid particle form. One suitable method for the preparation of particle form polymer is disclosed in the copending application of Leatherman et al., Serial No. 590,567, filed June 11, 1956, now abandoned. In the following discussion the term "particle form polymer" will be employed to designate a polymer of an olefin formed as a particulate solid in a diluent at the conditions of polymerization.

Another suitable, but non-equivalent, method of producing highly crystalline, high density polymers comprises contacting an olefin such is ethylene, propylene, 1-butene, and the like, with a two or more component catalyst wherein one component is an organometal compound, including those where one or more but not all organo groups is replaced by a halogen; a metal hydride; or a metal of Group I, II or III; and the second component is a Group IV to VI metal compound, e.g., salt or alcoholate. A third catalyst component which can be used advantageously is an organic halide or metal halide where the organic radical has thirty or less carbon atoms, and is advantageously an alkyl, cycloalkyl or aryl group. These catalysts are more fully discussed in the patent of W. B. Reynolds et al., Patent No. 2,886,561, issued May 12, 1959, and specific examples of such compounds are disclosed therein. The reaction using these catalysts is preferably carried out in the presence of a hydrocarbon diluent in liquid phase at a temperature in the range from room temperature up to about 300° F. Polymers produced in the presence of these catalysts have molecular weights which can range from 10,000 to 200,000 or higher. They generally have crystallinities of the order of 80 to 85 percent and densities of about 0.950.

A particularly suitable catalyst for the polymerization of propylene to a solid particle form polymer is a two-component catalyst system: (a) a dialkylaluminum halide compound and (b) a titanium trichloride complex. The dialkylaluminum halide compound can be represented by the formula RR'AlX wherein R and R' are selected from alkyl groups having from 1 to 12, inclusive, carbon atoms and wherein R and R' can be the same or different alkyl groups, and X is a halogen selected from chlorine, bromine, iodine or fluorine, preferably chlorine. Representative examples of suitable alkyl groups include methyl, ethyl, propyl, isobutyl, hexyl, octyl, decyl, dodecyl, and the like. A very suitable dialkylaluminium halide is diethylaluminum chloride. If desired, mixtures of dialkylaluminum halides can be used in the invention.

As previously mentioned, the second component of the catalyst system is a TiCl₃ complex, which can be formed by reacting aluminum with titanium tetrachloride. The preferred TiCl₃ complex can be described as being of the composition TiCl₃·XAlCl₃ in which X is a number in the range 0.1 to 1.0. A convenient method for the preparation of such a TiCl₃ complex is by reduction of titanium tetrachloride with metallic aluminum according to the formula $$3TiCl_4 + Al \quad\quad 3TiCl_3 \cdot AlCl_3$$ 

Temperatures are preferably in the range of 70° F. to 130° F. or higher and at a pressure sufficient to maintain liquid phase conditions. Hydrogen may be added to control flexural modulus and melt index. This catalyst system is more fully described in the copending application of Harban et al., Serial No. 102,954, and filed April 14, 1961.

It is to be noted that the conditions of polymerization depends on the monomer, catalyst and diluent employed. Broadly, the temperature preferred for particle form polymer is in the range of 70° F. to 250° F.

The term "polymer" includes both homopolymers and copolymers. Particularly preferred polymers are those described in the patent of Hogan et al. and the copending applications of Harban et al. and Leatherman et al., supra, incorporated as a part of this disclosure.

Difficulties have arisen in the preparation of particle form polymer due to the tendency of the polymer to accumulate on reaction surfaces, often in such amounts as to eventually force shutdown of the reactor until the polymer can be removed. Stirred tank reactors containing various arrangements of agitators, baffles, cooling coils, etc., have been tried with varying degrees of success without providing a combination suitable for use in every respect. Some of the combinations tested include (1) two and three turbine impellers on a common shaft with vertical radial baffles positioned around the reactor wall; (2) two shrouded propellers, one located above and the other below a turbine; (3) propellers with and without stationary baffles; (4) two turbine impellers on a common shaft with radial baffles comprising vertical feed banks; (5) solid wall draft tube with two and three propellers within the draft tube; and (6) solid wall draft tube with propellers and radial baffle positioned within the draft tube.

Many difficulties were encountered with these reactor configurations. It appeared that any conditions which caused a vortex to form and thereby produced a gas phase in the reactor resulted in the formation of melted polymer deposits on the reactor surfaces because of the inadequate heat transfer in those areas out of contact with the liquid diluent. Once these deposits commenced they usually continued to grow until the reactor became plugged with polymer. Polymer deposits also formed in unagitated zones, behind baffle supports, pipe collars and other irregular objects and between tubes and banks of tubes when these are used. The draft tube with radial baffle in the tube was somewhat successful but even with this arrangement entirely reliable operation could not be attained because the particles tended to settle out when the reactor slurry reversed direction and passed around the bottom of the draft tube.

It is an object of this invention to provide improved method and apparatus for producing high molecular weight, solid particle form polymer.

Another object of this invention is to provide improved method and apparatus for reducing fouling of reaction surfaces in the polymerization of olefins to form particle form polymers.

These and other objects of the invention will become more readily apparent from the following detailed description and discussion.

The foregoing objects are realized broadly by carrying out the polymerization reaction in a tubular closed loop reaction zone with smooth surfaces; catalyst, liquid diluent and hydrocarbon reactants being continuously moved through said zone at a velocity sufficient to prevent polymer settling and in the highly turbulent flow range and solid particle form polymer product being withdrawn from the reaction zone.

In one aspect of the invention movement of the contents of the reaction zone is provided by at least one propeller on a drive shaft, having associated therewith radially spaced straightening vanes projecting perpendicularly from the inner wall of the reactor and positioned adjacent to said propeller.

In one aspect, the polymerization reaction is carried out in a vertically disposed tubular closed loop reactor, said reactor being of uniform cross-section and substantially free from obstruction, containing at least one means for providing high velocity movement of the contents of the reactor through said reactor.

Particle form polymer can be prepared from olefin monomers, such as ethylene and propylene and from mixtures of ethylene and/or propylene with other saturated hydrocarbons, for example, mixtures of ethylene with minor amounts of higher 1-olefins, such as propylene, 1-butene, 1-pentene, 1-hexene, and the like. Examples of comonomers which can be used with ethylene and/or propylene include 1-olefins having no branching nearer the double bond than the 4-position and conjugated and non-conjugated diolefins, such as 1,3-butadiene, 1,4-pentadiene, 1,5-hexadiene, dicyclopentadiene and the like. The polymerization reaction is carried out in the presence of a liquid hydrocarbon diluent which is inert in the polymerization reaction and in which the polymer is insoluble under reaction conditions. Suitable diluents include paraffins such as those having from 3 to 12 and preferably 3 to 8 carbon atoms per molecule, for example, n-butane, n-pentane, isopentane, n-hexane, n-decane, etc., saturated cyclic hydrocarbons such as cyclohexane, cyclopentane and methylcyclopentane, methylcyclohexane, etc. It is also within the scope of the invention to employ as a diluent the monomer being polymerized, for instance, propylene is polymerized in liquid propylene. The polymerization reaction temperature will vary depending on the particular liquid diluent which is employed and on the olefin reactants and catalyst. Usually, however, when using a chromium oxide catalyst, polymerization is carried out at 230° F. and below, preferably between about 225° F. and about 150° F. The olefin reactants are contacted in the polymerization zone with a suspension of the subdivided chromium oxide catalyst in the liquid hydrocarbon diluent under the aforementioned temperatures and under pressures suitable to maintain the diluent in the liquid phase. Concentration of the catalyst in the reaction zone can vary widely; however, generally it will be in the range of 0.0001 to 5 percent by weight based on the liquid hydrocarbon diluent. For a more detailed description of the polymerization process including reaction conditions, catalyst, etc., reference can be had to the copending application of Leatherman et al., Serial No. 590,567, filed June 11, 1956.

Figure 2:
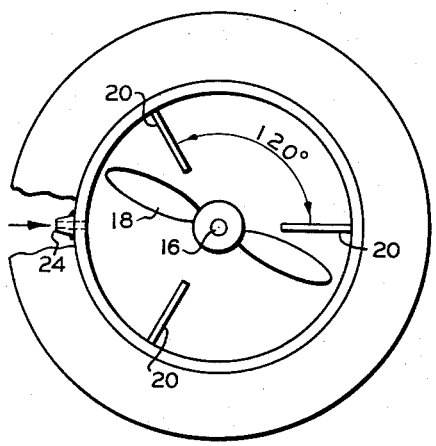

The invention is best described by reference to the accompanying drawings of which:

FIGURE 1 is a front elevation of a vertically disposed tubular loop reactor suitable for carrying out the invention; and FIGURE 2 is a cross-section through 2—2 of FIGURE 1 showing the disposition of the reactor propellers and straightening vanes.

Referring to the drawings, reactor 2, which is shown as being oblong in shape but may be any desired configuration, is made of flanged straight pipe sections and L's which are joined together to provide a continuous flow path which is substantially free from obstructions. The reactor is jacketed by sections 4 each of which contains an inlet 6 and outlet 8 for the introduction and removal, respectively, of a heat exchange fluid. Conduits 22 and 24 are provided for the introduction of catalyst and diluent, and olefin reactant, respectively, and conduit 26 is utilized for removal of reaction product. A drain 28 is provided in the lower portion of the reactor for the removal of the reactor contents, for inspection, cleaning, etc., of the reactor. Thermocouples 10 are provided at spaced intervals for sensing the temperature in the reactor. Provision is made to transmit a measurement of the reactor temperature at 12 to a temperature recorder controller (not shown) which can be utilized to control the reactor temperature. Various control methods can be used including control of the heat exchange fluid to jackets 4, control of the quantity of reactant or reactants entering the reactor or control of the amount of catalyst entering the reactor, etc. Vertically disposed nozzle 14 contains a drive shaft 16 which connects to propellers 18 disposed in a vertical leg of the reactor. Suitable means (not shown) can be provided outside the reactor for actuating the drive shaft 16 and propellers 18. Considerable agitation is produced by propellers 18 and this is converted in part to flow energy by providing straightening vanes 20, formed by metal plates projecting perpendicularly from the inner wall of the reactor and positioned adjacent to propellers 18. The straightening vanes which can be constructed from ordinary steel plate are spaced radially and uniformly (120° apart) about the inner wall of the reactor.

In the apparatus of FIGURES 1 and 2 the vertical leg in which the propellers 18 are positioned is of larger diameter than the remainder of the reactor; however, if desired the entire reactor can be of substantially uniform cross-section. The various parts which make up the reactor are constructed to provide a smooth continuous inner surface presenting a minimum obstruction to flow. The only obstructions of any consequence in the reactor are the propellers 18 and straightening vanes 20. As stated previously the particular reactor shown is made up of flanged sections; however, a partially or completely welded reactor can also be used.

In carrying out the polymerization process in the apparatus of FIGURES 1 and 2, polymerization catalyst, such as chromium oxide containing hexavalent chromium associated wtih silica-alumina is slurried in a diluent, such as normal pentane and introduced to reactor 2 through opening 22. Upon entering the reactor the catalyst and diluent are entrained in the swiftly moving contents of the reactor, passing downwardly through the propelling section formed by propellers 18 and straightening vanes 20. It is preferred that the olefin reactant, for example ethylene, be introduced to the reactor at a point of maximum turbulence in order to provide good contact between this material and the flowing subdivided catalyst. For this reason the olefin may be introduced between propellers 18 which bound a region of high turbulence or downstream of said propellers. As the reactants, catalyst, diluent and also solid particulate polymer reaction product pass from the propelling section a portion of the turbulence imparted by the propellers is converted by straightening vanes 20 to flow energy, thereby providing a high velocity stream leaving this section. In order to maintain the particle form polymer which results from the polymerization reaction in suspension in the flowing reactor contents, it is necessary that the velocity in the reactor be maintained sufficiently high to prevent settling due to gravity and in the highly turbulent flow range. The term "turbulent" is used herein in the conventional hydraulic sense, namely, as defining flow which is non-streamline or non-linear. Ordinarily fluid flow in terms of the conventional Reynolds number $$\frac{\text{Diameter} \times \text{velocity} \times \text{density}}{\text{Viscosity}}$$

is "linear" or "streamline" at values up to about 1200 and "turbulent" at values above 2200. Between these two values lies a transition region in which the flow may be either streamline or turbulent, depending on factors, such as, the roughness of the walls bounding the flow path. (See Crane Company Technical Paper No. 409, May 1942.) In the preparation of particle form polymer it has been found that operation of the reactor merely in the turbulent flow region does not prevent polymer deposition. In order to provide a process which operates continuously and for extended periods it has been found necessary to maintain the reactor contents in a highly turbulent state and above a minimum flow velocity. The relationship between the various factors influencing the rate of settling of solids from a circulating slurry system is extremely complex. The minimum flow velocity as defined herein is that velocity below which the solid settles freely and are not suspended by eddy currents. As the velocity is increased above the minimum, a point is reached when the entire mass of solids is carried in a near homogeneous flow and there is no concentration gradient from the top to the bottom of the horizontal pipe. This latter is the preferred limiting velocity and is frequently referred to as the standard velocity. Among the more important factors are the volumetric fraction of solids in the slurry, internal pipe diameter, particle diameter and density as well as density and viscosity of the carrying liquid which will contain some dissolved polymer which influences both factors. It has been found that for the polymerization of olefins, e.g. propylene, in a liquid hydrocarbon diluent, e.g. propylene, in a loop conduit, the following relationships are preferred.

Table A

| Loop conduit internal diameter, inches: | Referred flow velocity ranges ft./sec. |
|---|---|
| 5 | 4–15 |
| 10 | 6–20 |
| 15 | 8–25 |
| 20 | 10–30 |
| 25 | 12–35 |
| 30 | 13–40 |
| 40 | 15–45 |

Obviously, the required minimum fluid velocities and the resultant Reynolds numbers employed in the process will also vary depending on the particular monomers which are polymerized, the diluent used, and the polymerization reaction conditions. The maximum Reynolds number can be as high as 25,000,000 to 35,000,000 or higher; however, power consumption increases rapidly at the higher values and it is preferred to operate in the lower ranges of flow velocity and Reynolds number.

Conversion of the olefin to polymer takes place as the mixture of catalyst, diluent and olefin passes through the reactor loop and back into the original points of introduction of these materials. Periodically or continuously, as desired, reaction product is withdrawn from the reactor through opening 26 which may be at any convenient position on said loop conduit. The reaction effluent is subjected to further processing (not shown) for the separation of polymer, catalyst, diluent and unreacted olefin. The reaction temperature is conveniently controlled by controlling the flow rate of cooling fluid passed through heat exchange sections 4.

A major problem in maintaining the particle form polymer in admixture with the reaction contents and thereby preventing deposition of said polymer on reactor surfaces is presented in the portions of the reactor wherein flow is in the horizontal or substantially horizontal plane. When the reactants are passing in a vertical direction, either upwardly or downwardly, little difficulty is encountered in preventing polymer deposition. For this reason the reactor is preferably positioned vertically and further is preferably designed to provide a maximum of flow in the vertical direction and a minimum of flow in the horizontal direction. This is accomplished by providing a high reactor of short horizontal length. Usually the reactor is sized to provide a vertical length which is between about 2 and about 20 times the horizontal length of the reactor.

While the drawings have illustrated propeller means for imparting flow to the reactor contents it is within the scope of the invention to provide other types of motive power. For example, the propellers can be replaced by a pump of the impeller type. With a suitably designed pump, namely one which provides a maximum of flow energy, it is possible to reduce or entirely eliminate the use of straightening vanes in the reactor. Any conventional driver including a motor, turbine, etc., can be utilized for actuating the propellers, pump or other motive means provided for moving the reactor contents.

The following data are presented in illustration of the invention.

EXAMPLE I

Particle form ethylene homopolymer and ethylene-butene copolymer were prepared in a tubular closed loop reactor having a capacity of 95 gallons. The reactor was composed of three sections of 10 inch I.D. pipe, each approximately 4½ feet long and one 4½ foot length of 12 inch I.D. pipe which contained the propellers and vanes, and connected by four ells. The polymers were prepared in the presence of normal pentane and a catalyst comprising about 2.5 percent by weight of chromium oxide, containing hexavalent chromium, with silica-alumina.

The conditions employed in preparing the polymers were as follows:

Table I

| Reactor conditions | Ethylene homopolymer | Ethylene-butene-1 copolymer |
|---|---|---|
| Pressure, p.s.i.g. | 430 | 425 |
| Temperature, °F. | 210 | 197 |
| Jacket Temperature, °F.; | | |
| In | 192 | 177 |
| Out | 198 | 182 |
| Catalyst concentration,[1] wt. percent | 0.0310 | 0.0042 |
| Solids in reactor,[1] wt. percent | 22 | 15.3 |
| Flow Rates; | | |
| Ethylene, s.c.f.h | 400 | 380 |
| Butene-1, g.p.h | | 0.45 |
| n-Pentane diluent, g.p.h | 9.4 | 15.0 |
| Catalyst slurry, g.p.h | 5.6 | ([2]) |
| Wt. percent solids | 0.25 | |
| Reactor contents, velocity ft./sec. | 6.3 | 6.3 |
| Reynolds number [3] | 2,000,000 | 2,000,000 |
| Polymer product, lb./hr | 21.8 | 15.0 |

[1] Based on n-pentane diluent.
[2] 1.5 gm catalyst/hour.
[3] Approximate.

The particle form polymer prepared in the above runs had the following properties:

Table II

| Properties | Ethylene homopolymer | Ethylene-butene-1 copolymer |
|---|---|---|
| Ash, wt. percent | 0.10 | 0.00 |
| Melt index [1] | 0.60 | 2.09 |
| Density, gm/cc [2] | 0.956 | 0.938 |
| Izod impact, ft. lb/in.[3] | 21.99 | 16.10 |
| Stiffness, psi [4] | 164,000 | 70,000 |
| Tensile strength, p.s.i. [5] | 4010 | 2810 |
| Elongation, percent [6] | 78 | 528 |
| Environmental stress cracking, hrs.[7] | 330 | 1000 |
| Zero strength temperature, °F.[8] | 254 | 238 |

See footnotes at end of Table IV.

The ethylene homopolymer was made during a 21-day continuous run during which no problems were encountered due to polymer deposition in the reactor. The ethylene-butene-1 copolymer was made during a 33-day run in which polymer deposition in the reactor was not a problem. During these runs the flow velocities and Reynolds numbers in the reactor were sufficient to maintain the polymer particles in suspension.

In addition to the above runs a six-week endurance run was made (ethylene-butene-1 copolymer), following which the reactor was opened and found to be substantially free from polymer deposits.

Attempts to operate the above reactor under substantially identical conditions to those hereinbefore set forth except for a reduced velocity of less than 6 feet per second were unsuccessful due to settling of the polymer particles and consequent plugging of the reactor requiring complete shutdown to remove the polymer plugs.

EXAMPLE II

Particle-form propylene homopolymer is prepared in a tubular closed loop with an internal diameter of 20 inches and a capacity of 3620 gallons. The reactor is composed of 8 sections of 20-inch I.D. pipe, each 50 feet long, and connected by 8 20-inch ells. The reactor pump is capable of 18,100 g.p.m. flow and is driven by a 125 h.p. turbine. The polymer is prepared in liquid propylene diluent. The catalyst used is diethylaluminum chloride and a $TiCl_3$ complex (Aluminum reduced $TiCl_4$ obtained from Stauffer Chemical Co.).

Conditions are as follows:

Table III

| | |
|---|---|
| Reactor conditions: | |
| Diameter of loop, inches | 20 |
| Pressure, p.s.i.g. | 355 |
| Temperature, F. | 120 |
| Jacket temperature, °F.— | |
| In | 86 |
| Out | 96 |
| Solids in reactor, wt. percent | 35 |
| Velocity in reactor, ft./sec. | 20 |
| Flow rates, lb./hr.: | |
| Propylene | 251,420 |
| Propane | 17,475 |
| $TiCl_3$ complex | 100 |
| DEAC | 80 |
| Hydrogen ($H_2$) | 16 |
| Pentane with $TiCl_3$ | 100 |
| Polypropylene product | 91,460 |

The resultant particle-form polypropylene thus prepared has the following properties:

Table IV

| | |
|---|---|
| Inherent viscosity [9] | 2.0 |
| Melt index [1] | 5.0 |
| Flexural modulus, p.s.i. [10] | 230,000 |
| Tensile strength at yields, p.s.i. [5] | 5,000 |
| Density [2] g./cc. | 0.908 |
| Shore D hardness [11] | 75 |
| Tensile elongation [5] | 100% |

[1] The method of ASTM D-1238-52T is used except that the polymer sample is allowed to extrude from the test apparatus for nine minutes at which time the extrudate is cut off with a spatula. The extrudate is cut off again at the end of eleven minutes. The 9 to 11 minute cut is weighed. This weight is multiplied by 5 and reported as the melt index value. This test is run under high load conditions (21,600 grams).

[2] Determined by placing a pea-sized specimen cut from a compression molded slab of the polymer in a 50-ml. glass-stoppered graduate. Carbon tetrachloride and methyl cyclohexane were added to the graduate from burettes in proportion such that the specimen is suspended in the solution. During the addition of the liquids the graduate is shaken to secure thorough mixing. When the mixture just suspends the specimen, a portion of the liquid is transferred to a small test tube and placed on the platform of a Westphal balance and the glass bob lowered therein. With the temperature shown by the thermometer in the bob in the range 73-78° F. the balance is adjusted until the pointer is at zero. The value shown on the scale is taken as the specific gravity.

[3] Determined by method of ASTM D-256-47T.

[4] Determined by method of ASTM D-747-58.

[5] Determined by method of ASTM D-638-52T.

[6] Determined by method of ASTM D-638-52T.

[7] Test specimens for the environmental stress cracking tests were die cut from compression molded slabs 0.125±0.005 inch thick. The dimensions of these specimens were 1.5±0.1 inches by 0.50±0.02 inch. Each sample was given a controlled imperfection 0.750±0.005 inch long and 0.020-0.025 inch deep parallel to the long edges of the sample and centered on one of the broad faces. Each of the 10 test specimens were bent into a loop with the controlled imperfection on the outside and inserted in a holder one above the other in a manner such that the samples did not touch one another. The holder was then inserted in a tube which was filled to approximately 0.5 inch above the top specimen with an alkyl aryl polyethylene glycol (Igepal CO-630, General Dyestuff Corp., New York, New York), a surface active agent, which had been adjusted to a temperature of 23±1.1° C. The tube was then stoppered and placed in a constant temperature bath at 50±0.5° C. The controlled imperfections were not allowed to touch the tube during the test. The test specimens were examined at intervals, and any crack visible to the unaided eye was interpreted as a failure, exclusive of extension of the controller imperfection. The number of failures was plotted versus the logarithm of time and the best line was drawn through these points. The stress-crack time, $F_{50}$, is the time in hours taken from the curve at five failures. This test is similar to that described in Industrial and Engineering Chemistry, 43, 117-121 (1951).

[8] A test specimen is cut from 4-5 mil film to provide a specimen about 2.5 inches long and 0.25 inch wide in the center test section. The specimen is suspended vertically in an oven that is gradually heated by a circulating air stream. A weight is attached to the bottom end of the specimen and a measuring scale is positioned such that the bottom of the weight is even with zero on the scale. The temperature is raised at 2° F. per minute. The temperature at which the specimen elongates 1 inch is the no strength temperature.

[9] Measured in Decalin @ 135° C. by the method of Kemp et al., Industrial and Engineering Chemistry, 35, 1108 (1943).

[10] ASTM D-790-58T.

[11] ASTM D-676-58T.

Having thus described the invention by providing specific examples thereof, it is to be understood that no undue limitations or restrictions are to be drawn by reason thereof and that many variations and modifications are within the scope of the invention.

I claim:

1. A reactor comprising, in combination: a substantially internally unobstructed loop conduit; propelling means positioned within said loop conduit; a monomer inlet to said loop conduit; a plurality of radial vanes positioned in said conduit adjacent and downstream of said propelling means to prevent swirling imparted by said propelling means; and outlet means from said conduit.

2. A reactor comprising, in combination: a substantially internally unobstructed loop conduit; propelling means positioned within said loop conduit; a monomer inlet adjacent said propelling means; a plurality of radial vanes positioned in said conduit adjacent said propelling means to prevent swirling imparted by said impelling means; said propelling means being positioned between said monomer inlet and said vanes; and outlet means on the opposite side of said loop conduit from said monomer inlet.

3. A reactor comprising, in combination: two vertical pipes and two horizontal pipes joined by ells to form a vertical loop conduit which is internally substantially unobstructed; a pair of propellers mounted on a common shaft axially positioned in one of said vertical pipes and passing through the wall of an adjacent ell; a plurality of radial vanes attached to an inner wall of said last-mentioned vertical pipe between said propellers; a plurality of radial vanes attached to an inner wall of said last-mentioned vertical pipe and positioned below the lowermost propeller; an inlet conduit in said last-mentioned vertical pipe between said propellers; and an outlet conduit on the opposite side of said loop from said inlet conduit.

References Cited by the Examiner
UNITED STATES PATENTS

| | | | |
|---|---|---|---|
| 2,330,118 | 9/1943 | Frey | 196—2 |
| 2,723,680 | 11/1955 | Danel | 137—561.1 |
| 3,087,917 | 4/1963 | Scoggin | 260—88.2 |

FOREIGN PATENTS 550,088 10/1956 Belgium.

JOSEPH L. SCHOFER, *Primary Examiner.*